Figure 1:
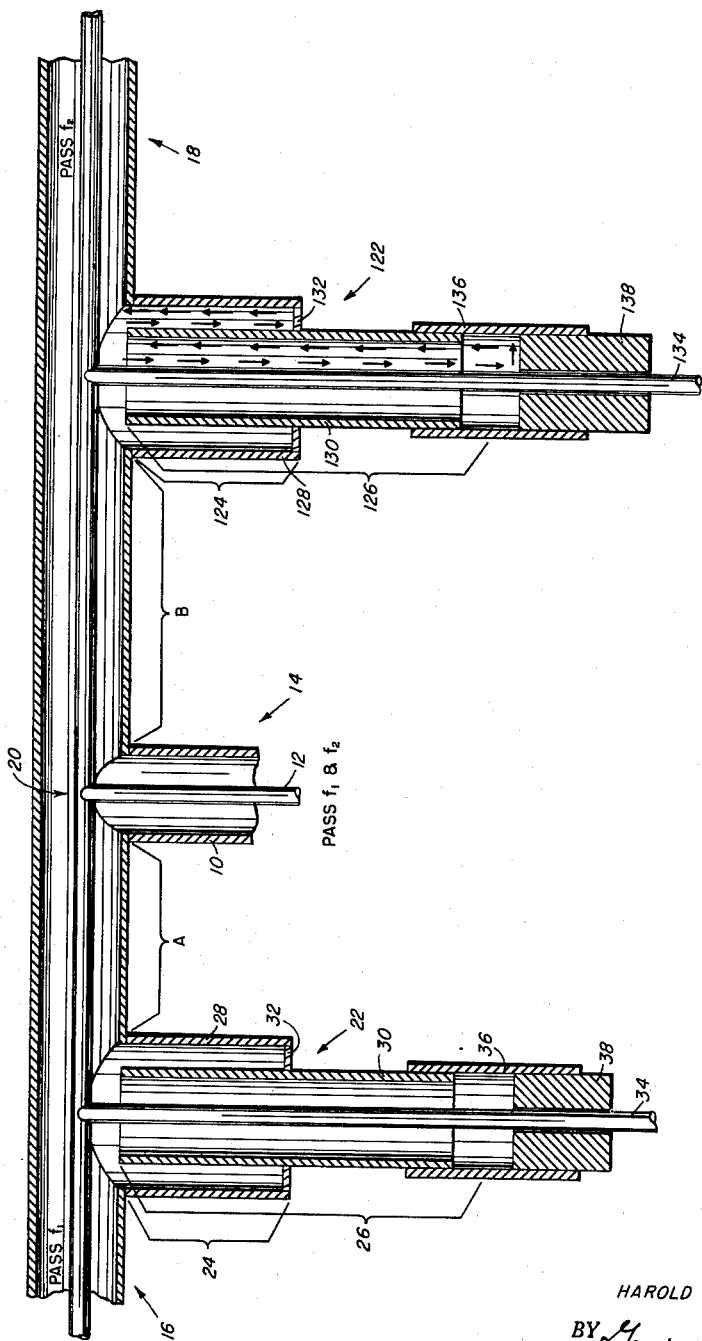

May 16, 1961  H. E. BRYAN  2,984,798
DUPLEXER
Original Filed Oct. 7, 1955
2 Sheets-Sheet 1

INVENTOR.
HAROLD E. BRYAN
BY
ATTORNEYS

May 16, 1961  H. E. BRYAN  2,984,798
DUPLEXER
Original Filed Oct. 7, 1955

2 Sheets-Sheet 2

INVENTOR.
HAROLD E. BRYAN
BY George Sipkin
George E. Pearson
ATTORNEYS

United States Patent Office 2,984,798
Patented May 16, 1961

2,984,798
DUPLEXER
Harold E. Bryan, 9175 San Juan Place, La Mesa, Calif.
Continuation of application Ser. No. 539,296, Oct. 7, 1955. This application Aug. 26, 1959, Ser. No. 836,311

2 Claims. (Cl. 333—9)

(Granted under Title 35, U.S. Code (1952), sec. 266)

The invention described herein may be manufactured and used by or for the Government of the United States of America for governmental purposes without the payment of any royalties thereon or therefor.

This application is a continuation of copending application No. 539,296, titled Duplexer, filed October 7, 1955, and now abandoned.

This invention relates to high frequency transmission lines and more particularly to a transmission line system for passing a plurality of signals of different frequencies to or from a common load or source.

In apparatus which is adapted to transmit a signal at one frequency and to receive a signal at a second frequency there are frequently employed two antennas, one coupled with the transmitter and the other coupled to the receiver. Where an antenna is capable of accepting both frequencies, a single antenna and a branched transmission line may be utilized. In such an arrangement, provision must be made for limiting each frequency to its proper channel in order to avoid interference of the transmitted signal with the receiver and vice versa.

The transmission line or duplexer of the present invention comprises a pair of branch lines and a feeder line having a common junction. The feeder line is adapted to pass a pair of signals which may be of slightly different frequencies while each branch line will pass only one of the two signals and reject the other. To accomplish this result, each branch line has a shunting stub line assembly connected across the conductors thereof and of electrical length such as to provide a short circuit across the branch line at reject frequency and an open circuit across the branch line at pass frequency.

It is an object of this invention to provide an improved means for passing a plurality of signals of different frequencies to or from a common load or source.

A further object of this invention is the provision of a transmission line which will pass a signal of one frequency with minimum attenuation and which will reject a signal of different frequency.

Still another object of this invention is the provision of a transmission line which, while rejecting a signal of one frequency, will not interfere with the passage of such signal through another line.

Still another object of this invention is to provide a plural frequency branched transmission line wherein one branch will pass all frequencies and other branches will each pass only one frequency while rejecting others.

A further object of this invention is the provision of an improved stub line which will permit passage of a signal of one frequency through a transmission line and will cause the rejection of a signal of slightly different frequency.

Figure 2:
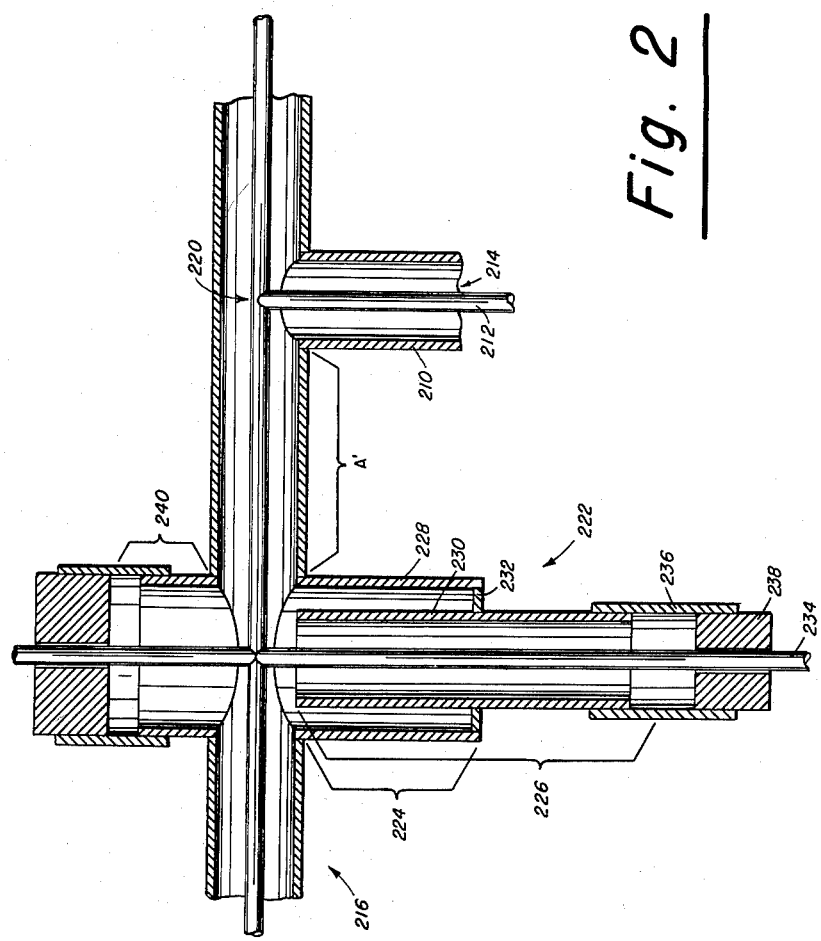

Other objects and many of the attendant advantages of this invention will be readily appreciated as the same becomes better understood by reference to the following detailed description when considered in connection with the accompanying drawings wherein:

Fig. 1 is a sectional view of one embodiment of the branched transmission line of this invention; and Fig. 2 is a sectional view of a portion of a modification of transmission line of Fig. 1.

The transmission system shown in Fig. 1 as being formed of coaxial line having a cylindrical outer conductor 10 and a solid inner conductor 12 includes a feeder line 14 and a pair of branch lines 16, 18 jointed thereto at a common junction 20. Feeder line 14, which may be a non-resonant line coupled to a transmitting and receiving antenna (not shown) is adapted to pass signals from a transmitter (not shown) and to a receiver (not shown). The signals are of different frequencies which may be, for example, a transmitted frequency $f_2$ of 490 megacycles per second and a received frequency $f_1$ of 470 megacycles per second. It is to be understood that the antenna, transmitter and receiver are mentioned merely as exemplary forms of signal source and load. The apparatus of this invention may be used in any system wherein both signals of a pair of different frequency signals are to pass through a common transmission line section and wherein each of two other branch lines must pass only one of the signals and reject the other.

From junction 20 the received signal $f_1$ is passed through branch line 16 to a receiver while a signal $f_2$ from a transmitter is passed through branch line 18 to the junction and thence through line 14.

To cause branch line 16 to pass a signal of frequency $f_1$ and reject a signal of frequency $f_2$ there is connected across the conductors of the branch line a stub assembly 22 which comprises a pair of series connected shorted coaxial stub lines 24, 26. Stub line 24 is comprised of conductors 28, 30 and a shorting plug 32 which determines the electrical length of the line. Plug 32 is shown as fixed but it may be made movable if it is deemed necessary to effect adjustment of the stub line 24. The stub line 26 is partially (or entirely, depending on frequencies involved) disposed within stub line 24 and is comprised of conductors 30 and 34, fixed sleeve 36 and axially shiftable shorting plug 38 which determines the electrical length of the stub line 26.

To cause branch line 18 to pass a signal of frequency $f_2$ and reject a signal of frequency $f_1$ there is connected across the conductors of the branch line 18 a stub assembly 122 comprising elements 124—138 which are structurally and functionally similar to elements 24—38 except for the fact that they are arranged for a different frequency. It will be seen that each of stub assemblies 22, 122 comprises two sections of coaxial line with the outer conductor 30, 130 of the inner section 26, 126 constituting the inner conductor of the outer section 24, 124 and the path of current flow through each series connected pair of sections will be as indicated by the arrows on assembly 122.

Either one of sections 24, 26 of assembly 22 (section 24 for example) is chosen to have a length of one quarter wavelength at pass frequency ($f_1$) and this shorted section therefore presents a high resistive impedance across the conductors of the branch line 16 at pass frequency whereby signal $f_1$ is passed with minimum attenuation. At this frequency the electrical length of the other section 26 is immaterial since it is in series with the high impedance section 24.

At reject frequency ($f_2$) the section 24 has a reactance determined by the frequency difference between $f_1$ and $f_2$. For example, if $f_2$ is only slightly greater than $f_1$, section 24 which is a quarter wavelength at $f_1$ will have a capacitative reactance at $f_2$. Section 26 would be chosen, therefore, to present an inductive reactance at $f_2$ which is equal to the reactance of section 24. In other words section 26 is chosen to present, at frequency $f_2$, a reactance which is equal and opposite to the reactance of section 24 at $f_2$ whereby the two series connected sections present a series resonant short circuit across the conductors of branch 16 at reject frequency. In order to avoid interference of the short circuit in branch 16 with the transmission of signal $f_2$ through the other branch 18, the stub assembly 22 is located at a distance A from junction 20 which is an odd multiple of one quarter wavelength at frequency $f_2$. Thus the short due to the stub assembly 22 is reflected at junction 20 as an open circuit across the conductors of the transmission line.

The operation of assembly 122 is similar to that just described. Section 124 provides a high resistive impedance across branch 18 at the pass frequency $f_2$ thereof while sections 124, 126 together provide a series resonant short at reject frequency $f_1$ which is reflected at junction 20 as an open circuit across the conductors of the transmission line by virtue of the quarter wavelength distance B between the junction and stub assembly at reject frequency.

In Fig. 2 is shown a modified stub assembly applied to branch line 16. Elements 224—238 are similar to elements 24—38 with the exception of the electrical length of section 224 at pass frequency. The electrical length of this section at $f_1$ presents a reactance $X_1$. At $f_1$ section 226 presents a reactance $X_2$ such that the series sections present a net reactance $X_3$ across the conductors of the branch line at pass frequency. A compensating shorted coaxial stub line 240 is connected across the branch line conductors in parallel with the series sections 224, 226 and is arranged to present a reactance $X_4$ at pass frequency which is equal and opposite to the net reactance of the series connected stub lines. Thus a parallel resonant condition is presented across the branch line to permit passage of signal $f_1$ therethrough by providing a high resistive impedance across the conductors of the branch line.

At reject frequency $f_2$, the operation is the same as that of the embodiment of Fig. 1. Sections 224, 226 have equal and opposite reactances to provide a series resonant short which is reflected at junction 20 as an open circuit across the conductors of the line by virtue of the quarter wavelength distance A'.

The invention has been disclosed, for convenience, with reference to coaxial transmission line but it will readily be appreciated that the principles described above may equally well be utilized with other types of high frequency transmission line such as, for example, the two-wire or parallel-conductor line, the twisted pair, the shielded pair and wave guides.

Where shorted or closed-end stub lines have been shown it will be readily apparent that open end lines may be used with appropriate changes in electrical length. For example, a shorted section which presents a high resistive impedance at quarter wavelength might be replaced with an open end section of half wavelength as is well known.

It will be understood that line sections of one quarter wavelength and one half wavelength may be replaced by sections of integral multiples of such lengths to yield the same results.

Obviously many modifications and variations of the present invention are possible in the light of the above teachings. It is therefore to be understood that within the scope of the appended claims the invention may be practiced otherwise than as specifically described.

What is claimed is:

1. A coaxial transmission line system adapted to selectively and simultaneously pass and reject signals of different predetermined frequencies comprising in combination a coaxial feeder line, a pair of coaxial branch lines connected to said feeder line and to each other at a common junction, a first stub means coupled to one of said pair of branch lines for passing a first frequency signal and rejecting a second frequency signal, a second stub means coupled to the other of said pair of branch lines for passing said second frequency signal and rejecting said first frequency signal, said first stub means including inner, intermediate, and outer coaxially disposed conductors and a first electrically conductive hollow cylindrical sleeve telescopically mounted on the extremity of said intermediate conductor constituting an extension thereof, said inner and outer stub conductors being conductively joined to the inner and outer conductors of said one of said pair of coaxial branch lines respectively, a first pair of movable shorting plugs one of which interconnects said intermediate and outer coaxially disposed conductors and the other of which is disposed within said first sleeve for simultaneous electrical contact therewith and said inner coaxially disposed conductor for causing same to effectively short circuit said first stub means at said second reject frequency, said second stub means including inner, intermediate, and outer coaxially disposed conductive elements and second electrically conductive hollow cylindrical sleeve telescopically mounted on the extremity of said intermediate conductive element constituting an extension thereof, said inner and outer stub conductors being conductively joined to the inner and outer conductors of said other of said pair of coaxial branch lines respectively, a second pair of movable shorting plugs one of which interconnects said intermediate and outer coaxially disposed conductive elements and the other of which is disposed within said second sleeve for simultaneous electrical contact therewith and said inner coaxially disposed conductive element for causing same to effectively short circuit said second stub means at said first reject frequency, said first and second stub means being coupled to their respective branch lines at distances from said common junction equal to one quarter wavelength of their respective reject frequencies, whereby the aforesaid effective short circuits are respectively reflected as open circuits at said common junction at said reject frequencies.

2. A coaxial transmission system adapted to pass signals of a first predetermined frequency while rejecting signals of a second predetermined frequency comprising in combination a coaxial feeder line having an inner and outer conductor, a coaxial branch line having an inner and outer conductor, said inner and outer conductors of said feeder and branch lines being respectively connected at a junction, a first coaxial stub means having an inner conductor connected to the inner conductor of said branch line and an outer conductor connected to the outer conductor of said branch line, said outer conductor being constructed in two parts with one telescopically mounted on the outside of other, a first shorting plug slidably mounted in said outside part of said first stub means outer conductor for electrical connection between same and the aforesaid first stub means inner conductor, a second coaxial stub means having an inner conductor connected to the inner conductor of said branch line, an outer conductor connected to the outer conductor of said branch line, and a two-part intermediate conductor with one part mounted on the outside of the other substantially at the outer extremity thereof, a second shorting plug slidably mounted for electrical interconnection between the outer and intermediate conductors of said second coaxial stub means, and a third shorting plug slidably mounted for electrical interconnection between the aforesaid intermediate and inner conductors of said second coaxial stub means at substantially the outer extremity thereof.

References Cited in the file of this patent

UNITED STATES PATENTS

| Number | Name | Date |
|---|---|---|
| 2,128,400 | Carter | Aug. 30, 1938 |
| 2,422,160 | Woodward | June 10, 1947 |
| 2,589,818 | King | Mar. 18, 1952 |
| 2,643,302 | Broadburd | June 23, 1953 |
| 2,701,339 | Everett | Feb. 1, 1955 |
| 2,713,152 | Brown | July 12, 1955 |
| 2,751,557 | Sosin | June 19, 1956 |
| 2,763,839 | Fiet | Sept. 18, 1956 |
| 2,779,000 | Sosin | Jan. 22, 1957 |
| 2,806,140 | Enenstein | Sept. 10, 1957 |